INVENTOR.
George J. House
BY
Dale A. Winnie
ATTORNEY

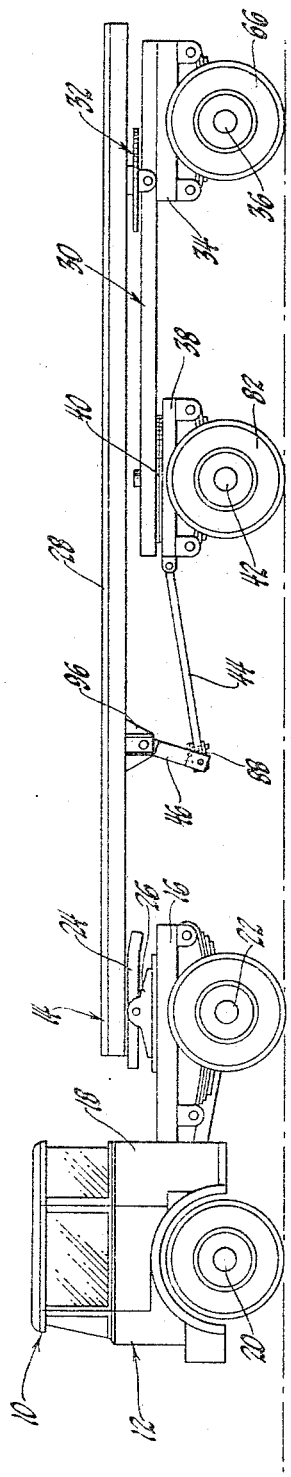
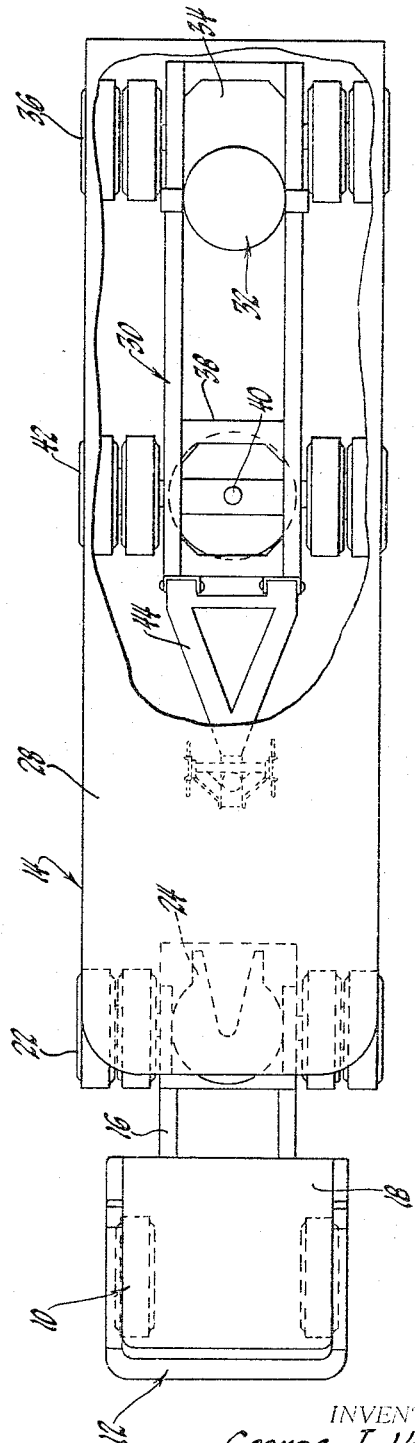
Fig. 1
Fig. 2
INVENTOR.
George J. House
BY
Dale A. Winnie
ATTORNEY May 9, 1967
G. J. HOUSE
3,318,613
SEMI-TRAILER TANDEM AXLE ARRANGEMENT
Filed Dec. 24, 1964
5 Sheets-Sheet 2
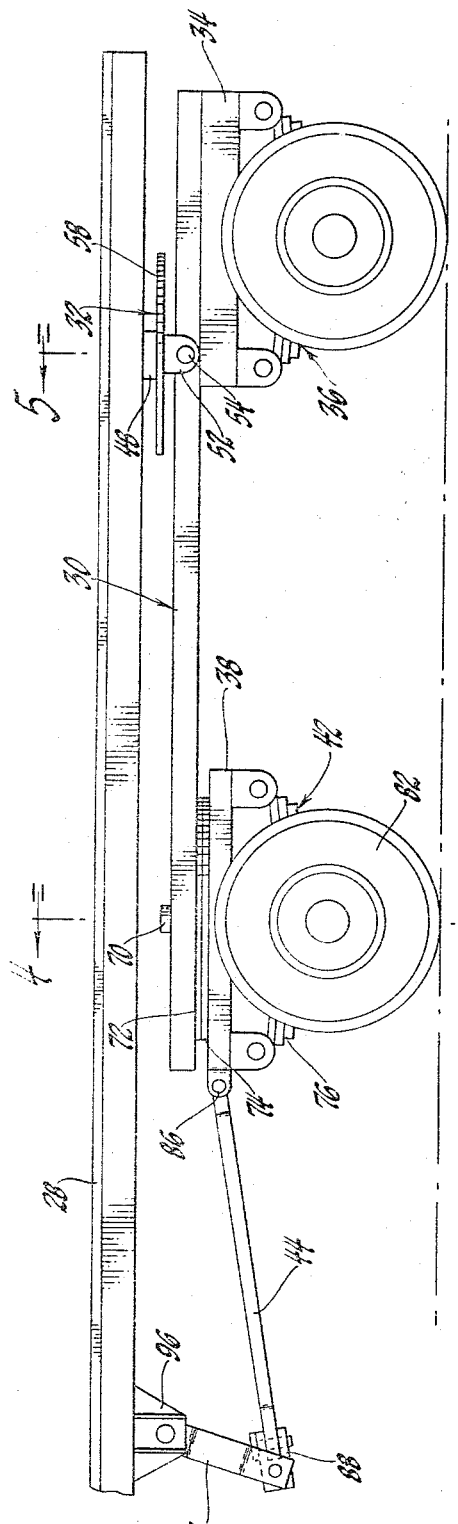
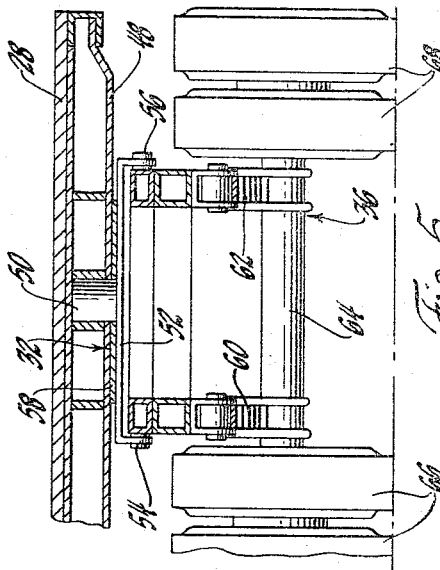
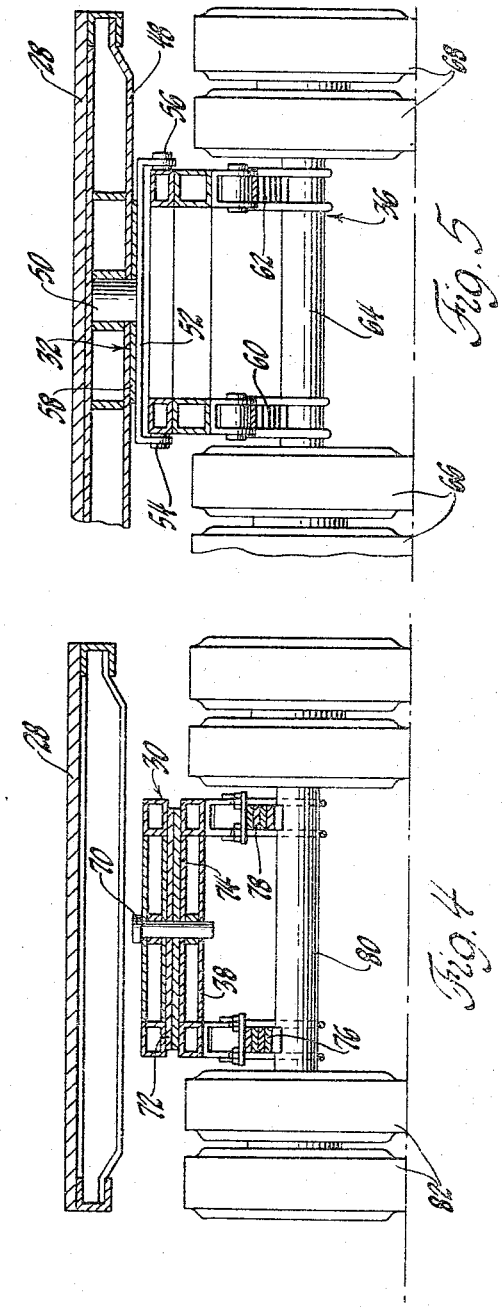
INVENTOR.
George J. House
BY
Dale A. Winnie
ATTORNEY May 9, 1967 G. J. HOUSE 3,318,613
SEMI-TRAILER TANDEM AXLE ARRANGEMENT
Filed Dec. 24, 1964 5 Sheets-Sheet 5

United States Patent Office 3,318,613
Patented May 9, 1967

3,318,613
SEMI-TRAILER TANDEM AXLE ARRANGEMENT
George J. House, 28912 Greencastle,
Farmington, Mich. 48024
Filed Dec. 24, 1964, Ser. No. 420,967
2 Claims. (Cl. 280—81)

This invention relates to tractor-trailer vehicles in general and more particularly to tandem axle arrangements for semi-trailers.

Highway vehicles are rated, in part, by the productive load they can carry over the nation's highways and byways. Although many things are considered in determining the productive capacity of a highway carrier, one simple measure of the productive load it can carry is in a comparison of the weight of a load carrying trailer when it is empty and when it is fully loaded. The difference is essentially the productive capacity of the vehicle.

Since most State and Federal regulatory agencies base license fees and taxes on the overall weight of a vehicle, it seems logical and natural for most manufacturers to try to reduce the vehicle weight wherever and however possible, without the sacrifice of load carrying capacity, and most important of all to do so in a way which improves its productive capacity.

Semi-trailers are very popular for highway use because they accomplish just this. They provide a highway vehicle which is lighter by the elimination of the front axle and suspension system of the trailer, in the fifth wheel connection to the tractor, and which has essentially the same load carrying capacity as a four wheel trailer would. As a consequence, its productive capacity is better and less of the license fees and taxes go for non-productive weight.

Unfortunately, there is a limit to this and it comes about as a consequence of State and Federal regulatory laws which limit the lengths of highway trailers and the load per axle allowed on the nations roads. These are necessary both for safety and the protection of the roads against loads too heavy for them to handle day in and day out.

Although efforts are being made to change State and Federal laws to allow longer trailers and those carrying heavier loads, on some of the new modern highways in particular, this offers only temporary relief for truckers and commercial carriers. This is why more and more thought is being given to tandem axle arrangements for tractor-trailer vehicles.

The tandem axle undercarriage for highway trailers has been considered before but it has always been discarded. One reason has been that longer trailers weren't as much in demand and only extremely heavy loads needed the double axle arrangement on a shorter load bed. Another reason, and the main one in most instances, has been that tire wear is too great on the conventionally known tandem axle systems.

Generally speaking, tire wear occurs in tandem axle arrangements where the two axles are unable to both align themselves radially and to track properly on different concentric arcuate paths that the different wheels must travel. With fixed axle arrangements this is absolutely impossible and even with some arrangements which have one of the axles pivotal relative to the load bearing trailer, or otherwise, one of the sets of wheels will usually track but the other will lock and slide on a turn.

Efforts to overcome this problem have been unsuccessful up until now.

Some tandem axle arrangements have met the problem of tracking but the means of accomplishment have been most unsuitable. For example, a lost motion slotted connection of a tandem axle undercarriage to a trailer member has been tried but wear and shock loading problems are only exchanged for those of tire wear.

In other instances wheeled axles have been pivotally connected to other wheeled axles only to find problems and difficulties in steering and in backing or otherwise maneuvering for position relative to a loading dock or elsewhere.

Although the problem of adding weight to that of the trailer, by the second axle, is not to be overlooked, it does not avoid the advantage of the semi-trailer connection. The tandem axle arrangement is for a bigger overall trailer. In other words, it is to be kept in mind that the load carrying capacity will be appreciably more increased than the weight of the trailer; otherwise, the change would be without purpose.

This invention offers the ideal tandem axle arrangement for highway vehicles.

It is an object of this invention to provide a tandem axle undercarriage for semi-trailers and the like and which permits free turning movement of both axles. This, of course, eliminates the problems of tire wear by providing a support structure which will track more properly.

It is also an object of this invention to provide a simple and relatively uncomplicated tandem axle undercarriage for a semi-trailer or the like wherein a sub-frame including one set of wheels is pivotally connected under the load bearing trailer frame and a dolly with another set of wheels is pivotally connected under the sub-frame member and has a steering tongue leading forward and connected to the underside of the trailer frame. However, the undercarriage is pivotally fixed and located relative to the trailer frame and no lost motion connection is provided therebetween.

It is an object of this invention to provide an undercarriage which is connected to the trailer by a fifth wheel arrangement, just as the trailer is connected to the tractor, and wherein it is not towed and steered, as is conventionally known, but is only steered by the forward leading part which is connected to the underside of the trailer frame.

A specific feature of the present invention is the pivotal link connection of the steering tongue of the undercarriage to the underside of the trailer frame to afford extended length thereto, in the maneuvering of turns and corners, while maintaining positive control and positive engagement at all times.

These and other objects and advantages to be gained in the practice of this invention will be better understood and appreciated upon a reading of the following specification in regard to a preferred embodiment of the invention and having reference to the accompanying drawings wherein:

FIGURE 1 is a side elevation of the tractor-trailer combination of this invention.

FIGURE 2 is a plan view of the tractor-trailer combination with a part of the load bearing platform broken away to show the undercarriage.

FIGURE 3 is an enlarged elevation of the trailer part of the tractor trailer combination.

FIGURE 4 is a transverse cross-sectional view of the trailer as seen in the plane of line 4—4 from the previous drawing figure.

FIGURE 5 is a transverse cross-sectional view of the trailer as seen in the plane of line 5—5 of FIGURE 3.

Figure 6:
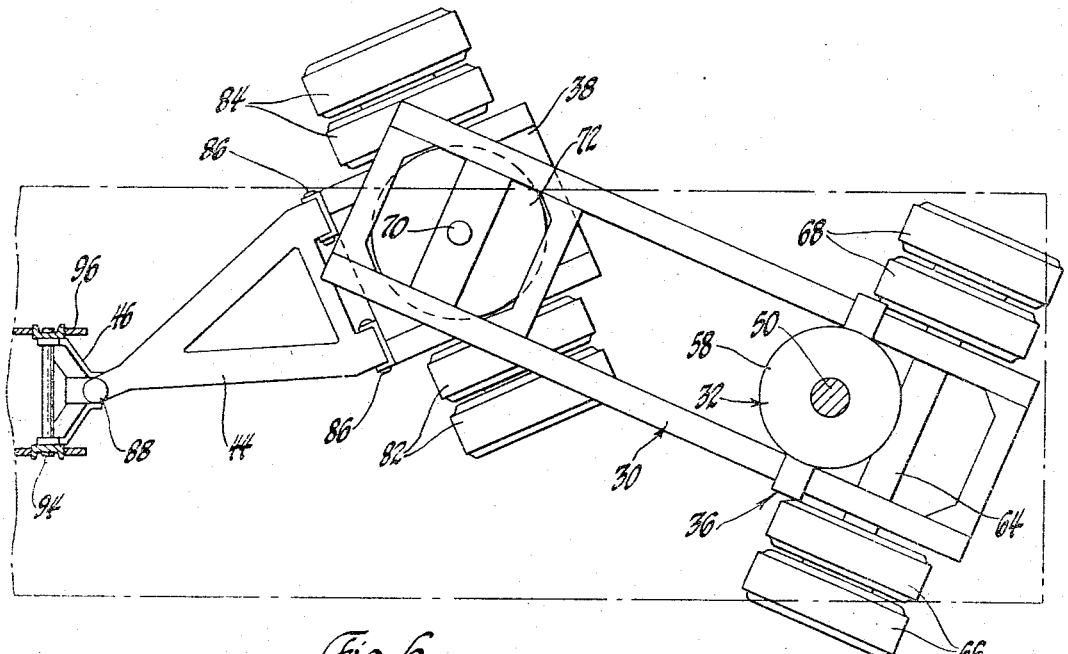
FIGURE 6 is an enlarged plan view of the undercarriage which supports the rear end of the trailer as turned in one angular position.

A tractor and semi-trailer vehicle 10 is shown by the drawings. It includes a tractor, identified generally at 12, and a semi-trailer, indicated generally at 14, which is connected to the tractor and pulled by it.

The tractor 12 includes a frame 16 which has a cab-over-engine enclosure 18 provided over the front end thereof. A steering axle and wheel assembly 20 is provided under the front end of the frame and another axle and wheel assembly 22 is provided under the back end of the frame. A fifth wheel member 24, of the type generally known, is carried on the rearwardly disposed end of the frame and includes a pivotal support 26 which enables it to rock about a horizontal axis.

The semi-trailer 14 includes a load bearing frame or platform member 28.

In the present instance, the semi-trailer 14 is shown as having a flat-bed carrying platform but it will be understood and appreciated that an enclosure might be provided thereover. This invention makes no distinction in this respect and, in fact, the invention is applicable to the enclosed, open or any other type of tractor drawn trailer.

As is generally known, the load carrying platform 28 of the semi-trailer 14 is connected to the tractor 12 by means of the fifth wheel member 24. The front end of the semi-trailer 14 is provided with a king pin (not shown) which enters a guideway in the fifth wheel 24 (shown but not identified in FIGURE 2) and is received in a socket to provide a vertical pivot about which the semi-trailer 14 can swing horizontally relative to the tractor 12.

Since the fifth wheel member 24 is provided on the pivotal support 26, a modest amount of rocking pivotal movement between the tractor and the trailer is also permissive.

The load bearing frame 28 of the semi-trailer 14 is supported by the tandem axle wheeled means of this invention under its after end which, in this instance, includes an undercarriage or sub-frame structure 30.

The trailer supporting undercarriage or sub-frame structure 30 is connected to the load bearing frame 28 of the trailer by means which enable both pivotal movement about a vertical axis and rocking movement about a horizontal axis. The connection which affords such movement is generally designated at 32 and is similar to the fifth wheel connection 24.

A wheel supporting structure 34 is provided under the after end of the sub-frame structure 30 and includes, in turn, a suspension, rear axle and wheel assembly 36.

A dolly member 38 is connected under the forward end of the sub-frame structure 30 by means of a pivotal connection 40 which includes a vertical axis. The dolly itself includes a suspension and forward axle and wheel assembly 42.

A steering tongue arrangement 44 is connected to the front end of the dolly 38 and, in turn, to a link 46 which hangs down under the load bearing frame 28.

Referring now to FIGURES 3–5, the sub-frame undercarriage structure 30 is shown in greater detail. The load bearing trailer frame 28 is shown to include a cross-rail 48 which is receptive of a pivot pin or shaft member 50 to which is engaged trunnion mount 52 that is pivotally engaged, as at 54 and 56, to the sub-frame 30.

The cross rail or frame member 48 may be one of many which make up the load bearing frame 28, although only one is shown. It will also be appreciated that a special heavy duty cross rail member might also be incorporated into the structure of the load bearing frame 28 for the purpose mentioned.

The connection made between the load bearing frame 28 and the sub-frame undercarriage structure 30 is very similar to the fifth wheel connection of the semi-trailer 14 to the tractor 12, as previously mentioned. The large bearing plate 58, in fact, serves like a fifth wheel plate for bearing and sliding engagement with the cross rail 48 in the horizontal swinging movement of the sub-frame undercarriage 30 relative to the load bearing frame 28. Similarly, the trunnion mount 52 enables the horizontal rocking movement that is also afforded in the fifth wheel connection 24 between the semi-trailer 14 and the tractor 12.

It will be noted that the pivotal connection between the sub-frame undercarriage structure 30 and the trailer frame 28 is disposed near the back end of the undercarriage member 30 and just forward of its load bearing axle and wheel assembly 36. Accordingly, the load bearing support for the trailer 14 at both the front and back ends thereof are reasonably spaced to span the full length of the trailer and provide a minimum weight overhang. Furthermore, the rearwardly disposed pivotal support of the undercarriage structure 30 to the trailer frame assures that the rearwardly disposed wheel structure will not be unduly exposed beyond either side of the load bearing platform in the course of making a turn as would and does result with those tandem axle arrangements pivotally supported more forwardly to the trailer.

The wheel supporting structure 34 which is a part of the sub-frame undercarriage 30, at the after end thereof, includes a box frame or like intermediate frame. To this is engaged the suspension springs 60 and 62, which support the axle 64 and, in turn, the rear trailer wheel 66 and 68.

Referring now to the FIGURE 4, the undercarriage dolly member 38 is best shown. It is pivotally engaged to the sub-frame 30 as by a pivot pin shaft or stud 70. The pivot pin member extends through the sub-frame 30 and into engagement with frame part of the dolly 38. A pair of bearing plates 72 and 74 are provided between the dolly and the sub-frame to assure good bearing surface for sliding contact and minimum friction therebetween. The dolly is outfitted with suspension springs 76 and 78 and an axle 80 which in turn supports the trailer wheels 82 and 84 thereon.

Figure 7:
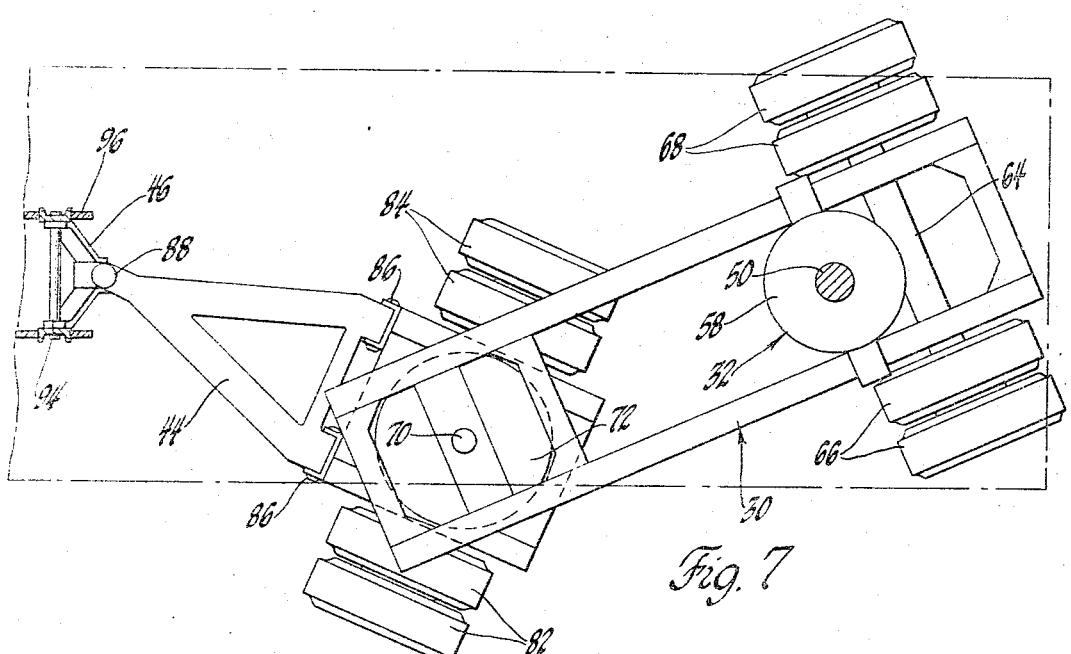
FIGURE 7 is similar to FIGURE 6 with the undercarriage turned in a different direction.

As shown in FIGURES 6 and 7, the dolly is pivotal about the vertical axis of the pivot pin member 70 to the right and left of the undercarriage 30. The undercarriage 30 is in turn pivotal to right and left about the vertical axis of the connection 32 to the load bearing trailer frame 28.

Figure 8:
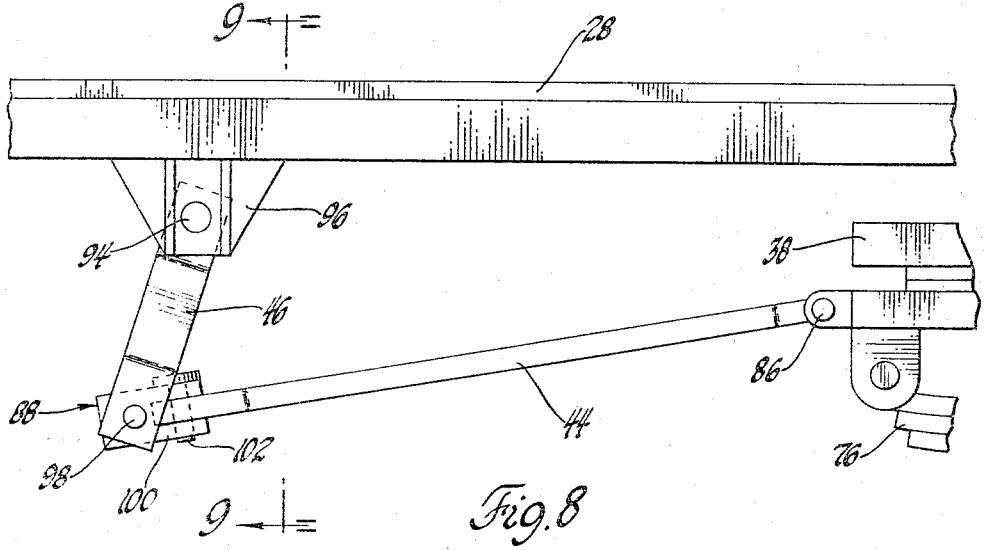
FIGURE 8 is an enlarged and fragmentary cross-section of a part of the steering apparatus for the trailer undercarriage.
Figure 9:
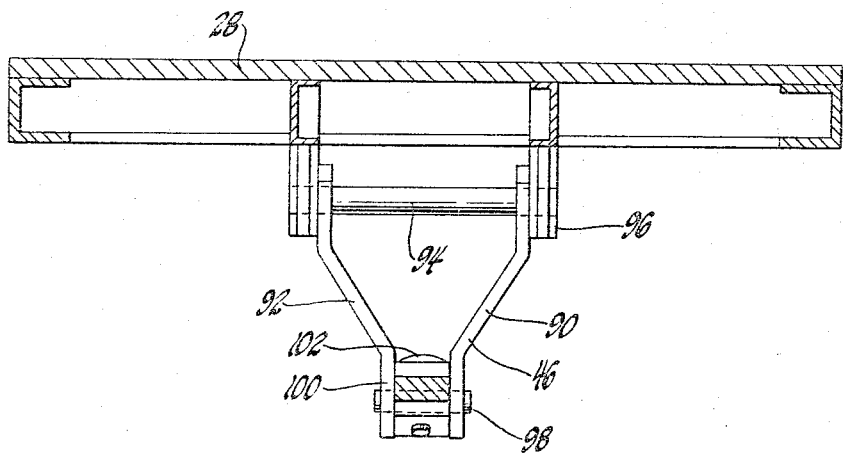
FIGURE 9 is a transverse and partially cross-sectional view of the steering apparatus of FIGURE 8 as seen in the plane of line 8—8 thereon.

Referring now to FIGURES 8 and 9, and in part to FIGURE 3:

The tongue arrangement 44 which is pivotally engaged to the front of the dolly 38 and is connected by link 46 to the underside of the trailer frame 28 is principally a steering tongue and is not used to tow the undercarriage structure 30. The tongue member 44 is of A-frame construction and is pivotally engaged to the front of the dolly member 38 as at 86. It is in turn engaged by a universal joint connection 88 to the connecting link 46.

The connecting frame link 46 is itself a yoke member with arms 90 and 92 which are pivotal on a pin 94 in a bracket 96 that is provided on the underside of the load bearing trailer frame 28. A pivot pin 98 at the fork of the frame link 46 has the universal joint block 100 engaged thereon and the tongue 44 is in turn pivotally in the block on a pivot pin 102 disposed transversely of the joint pin 98.

For all practical purposes, the undercarriage tongue 44 is afforded lateral and horizontal freedom just like the fifth wheel and sub-frame connections 24 and 32 previously described. At the same time, like the fifth wheel connections, there is a positive engagement which enables sure steering of the undercarriage 30 and consequently the trailer 14 as it is towed behind the tractor 12 and maneuvered around corners and turns on the highway in both forward movement and being backed into position relative to a loading dock or the like.

Although not specifically shown in detail, the tongue-to-block connection in the universal joint 88 includes a slight taper in the slot in the block to compensate for any excessive rocking in the undercarriage in transit not compensable otherwise in the steering connection.

Referring now to FIGURES 6 and 7:

In any forward turning or backward steering of the trailer 14 behind the tractor 12, the undercarriage sub-frame 30 is afforded both horizontal rocking and lateral freedom by the connection 32 to orient itself relative to the load bearing frame 28 so that its wheel bearing axle 64 is aligned with the turning radius point for the overall tractor-trailer vehicle 10. The dolly member 38 is similarly pivotal on the sub-frame 30 and free to rock with the sub-frame through the connection 32 to the load bearing trailer frame 28. The lateral freedom of the dolly 38 is in no way inhibited by the steering tongue 44 and its connection to the hanging link 46 on the underside of the load bearing frame 28. In fact, the universal joint connection 88 between the steering tongue 44 and the hanging link 46 is to assure just continued lateral freedom of movement for the dolly member.

The steering tongue assembly affords full and adequate control for the sub-frame undercarriage 30 in any forward turning or backward steering movement which is undertaken. The connecting link 46 in being pivotal rearwardly provides extended length for the steering tongue 44 and enables it to swing further to the right or left without being restrained.

No lost motion connection is required between the undercarriage and the load bearing frame. All connections are positively made and maintained at all times. Accordingly, the structure shown and described assures a minimum wear and friction in all instances.

When a right turn is executed, as in FIGURE 6, the undercarriage 30 is free to assume the position which enables its respective axles 64 and 80 to be directed more assuredly toward the turning radius point and so that tire wear is reduced to a minimum and, in fact, is non-existent.

A left turn has the same effect as is shown in the companion drawing figure.

Figure 10:
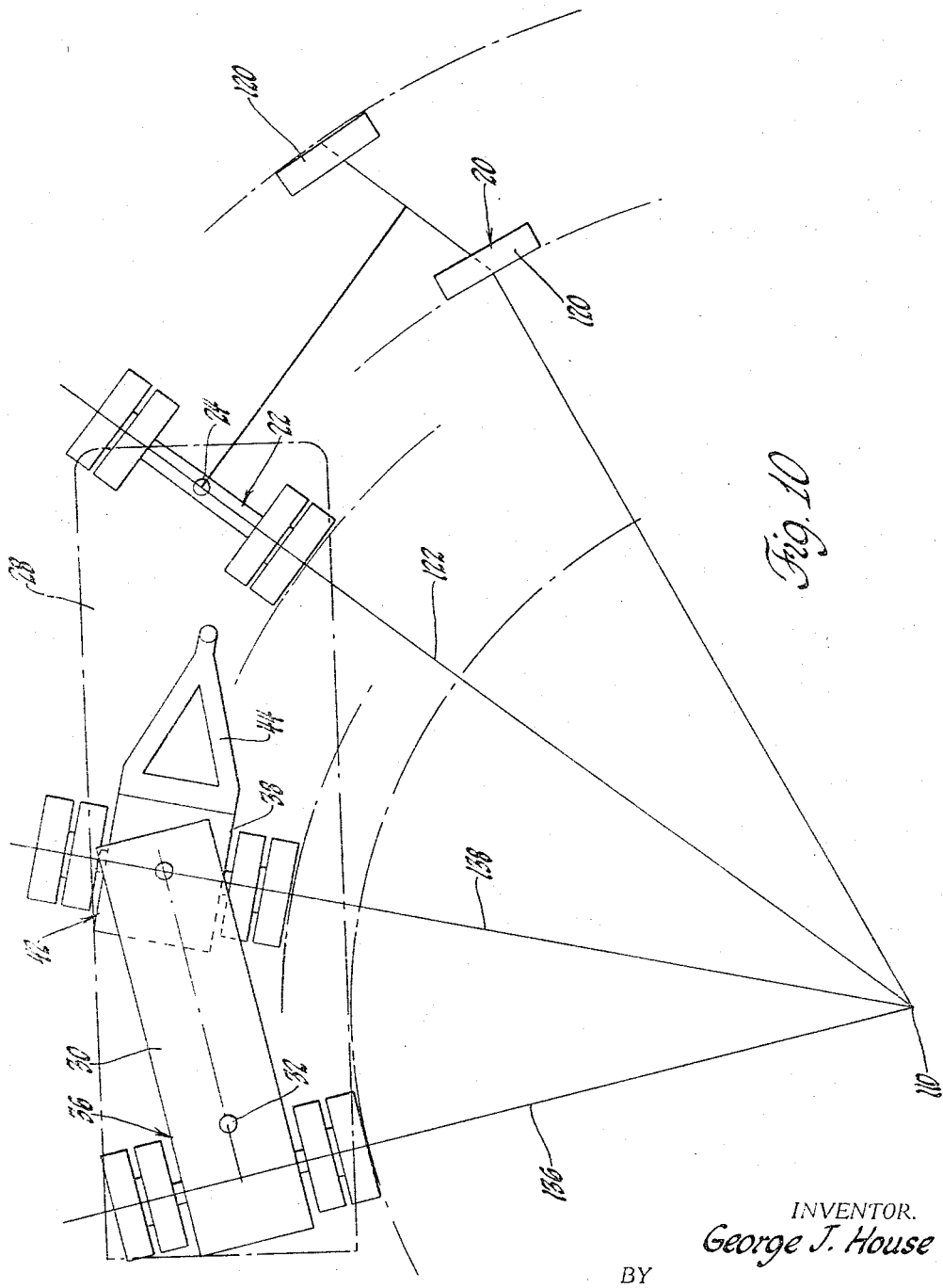
FIGURE 10 is a diagrammatic plan view of the tractor and trailer combination showing the relative axle and wheel positions and turning circles about a common turning radius center.

Referring now to FIGURE 10 for a synopsis and a few concluding remarks:

The tractor 12 includes the forward steering wheel arrangement 20 and the fixed axle after wheel assembly 22.

The semi-trailer 14 has its load bearing frame 28 pivotally engaged to the tractor 12 through the fifth wheel connection 24 over the rear axle of the tractor. It has a sub-frame 30 which is pivotally engaged to the trailer frame near the rear end of the trailer frame, as at 32, and which includes a fixed axle wheel assembly 36 under its after end and a dolly 38 pivotally engaged under its front end and including the forward wheel assembly 42 of the tandem axle arrangement of this invention.

The tongue 44 of the dolly 38 extends forwardly and is engaged to the depending link 46 under the trailer frame as has been well described previously.

Note that the tractor-trailer vehicle 10 in making a turn has all of the axles of the different tractor and trailer wheels pointing towards a common turning radius point 110. The steering wheels 120 of the tractor are properly oriented, the wheel assembly 22 has its axle on the radial line 122, the dolly wheels are on line 138, and the undercarriage wheels are on line 136.

The arrangement disclosed assures no wheel wear in turning and provides a positive connection between the load bearing trailer frame and its supporting undercarriage.

In closer or tighter turns, the turning radius point 100 moves in towards the semi-trailer on a line from where it is shown towards the pivotal axis 32 connecting the undercarriage 30 to the trailer frame 30. On wider turns the turning radius point moves out on an arc which eventually has the axles in parallel relation as the tractor-trailer travels a straight route down the highway.

Without further discussion it should be obvious that numerous other variations, modifications and combinations are conceivable and within the scope of this invention.

Although a preferred embodiment and several variations have been specifically shown and described in detail herein, it will be appreciated that this has been done to illustrate the scope of the present invention and without intent to unnecessarily limit the invention thereto in any regard. Accordingly, such improvements, modifications and alterations as come to mind and are within the spirit of this invention and not specifically excluded by the language of the hereinafter appended claims are to be considered as inclusive thereunder.

I claim:

1. In a tractor-trailer combination including a semi-trailer having a sub-frame provided under the rear end thereof, a fifth wheel connection between the semi-trailer and the sub-frame permissive of lateral pivoting and vertical rocking movement therebetween, a set of wheels supporting the after end of the sub-frame, a wheel carrying dolly provided under the front end of the sub-frame, and a steering connection provided on the dolly for engagement with the underside of the semi-trailer, the improvement, comprising;

said sub-frame being engaged to said semi-trailer via said fifth wheel connection near the after-end of said sub-frame and of said semi-trailer, inboard but relatively over the wheels supporting the after-end of said sub-frame, for minimum weight overhang of said semi-trailer and turning exposure of the after-end of said sub-frame, said fifth wheel connection including a vertical pin received in the frame of the semi-trailer and a trunnion mount secured to the pivot pin and engaged by horizontal pivot pins to the sub-frame, said dolly having a relatively fixed vertical pivot connection to the forward end of said sub-frame spacing the wheels thereof centrally of said semi-trailer and a greater distance from the trailer to sub-frame connection than the wheels supporting the after-end of said sub-frame for greater turning ease of the dolly wheels, a fore and aft fixed axis pivotal connecting link provided on the underside of the semi-trailer for engagement with the steering connection on the dolly, and the steering connection on the dolly including an A-frame tongue pivotally connected to said dolly about a fixed horizontal axis and for universal freedom of movement to said semi-trailer connecting link.

2. The tractor and trailer combination of claim 1, said dolly steering connection being of extended length and in combination with said semi-trailer connecting link having an effective length permissive of unrestricted turning ease for said sub-frame about the rearwardly disposed fifth wheel connection to said semi-trailer and of relatively free and unrestricted steering and turning ease for said dolly about its pivotal connection to said sub-frame and of relatively free wide and unrestricted turning ease for the front end of said sub-frame enabling said semi-trailer to be maneuvered readily and without wheel scuffing in making relatively tight turns.

References Cited by the Examiner

UNITED STATES PATENTS

| 2,373,398 | 4/1945 | Hoobler | 280—423 |
| 2,589,678 | 3/1952 | De Lay | 280—405 |
| 2,758,849 | 8/1956 | Compton | 280—104.5 |

KENNETH H. BETTS, *Primary Examiner.*